United States Patent [19]
Coviello

[11] Patent Number: 5,054,431
[45] Date of Patent: Oct. 8, 1991

[54] ADJUSTABLE ANIMAL FEEDER

[76] Inventor: Andrew G. Coviello, P.O. Box 11051, Greenwich, Conn. 06831

[21] Appl. No.: 445,042

[22] Filed: Dec. 4, 1989

[51] Int. Cl.$^5$ .............................................. A01K 5/00
[52] U.S. Cl. .................................... 119/61; 119/51.01
[58] Field of Search ..................... 119/61, 63, 52.1, 53, 119/54, 51.01, 57.92

[56] References Cited

U.S. PATENT DOCUMENTS

| | | | |
|---|---|---|---|
| 1,338,077 | 4/1920 | Hector | 119/61 |
| 1,594,290 | 7/1926 | Woessner et al. | 119/61 |
| 2,845,896 | 8/1958 | Copeland | 119/61 |
| 3,145,007 | 8/1964 | Swinney | 119/61 |

FOREIGN PATENT DOCUMENTS

| | | | |
|---|---|---|---|
| 3300770 | 7/1984 | Fed. Rep. of Germany | 119/61 |
| 671789 | 7/1979 | U.S.S.R. | 119/61 |
| 2198928 | 6/1988 | United Kingdom | 119/61 |

Primary Examiner—John G. Weiss
Attorney, Agent, or Firm—Robert A. Seemann

[57] ABSTRACT

A food supporting platform for animal food, and a vertical guide mounted on a frame for supporting the platform at a plurality of heights for access to the platform by the animal for feeding and by an operator not capable of stopping to service the platform. Threads on the guide, driven by hand crank or electirc motor, move the platform vertically. In another arrangement of the invention, the vertical guide includes a vertical track upon which the platform travels by way of a follower. A belt between an upper and a lower pulley, driven by hand crank or motor, is attached to the follower to move the platform to the plurality of heights.

20 Claims, 5 Drawing Sheets

ADJUSTABLE ANIMAL FEEDER

BACKGROUND OF THE INVENTION

1. Field of the Invention

In general this invention relates to support for a food supporting platform, more specifically to an apparatus for supporting an animal feeding food supporting platform variously at a height most suitable for the feeding animal and at a height at which an operator can service the food supporting platform and operate the apparatus for adjusting the food supporting platform without bending or stooping.

2. Description of the Prior Art

There is a recognized need for pet feeders which can be serviced and placed at a pets disposal by an operator who has difficulty bending, limited mobility, or who is bound to a wheelchair.

Tragically, many people who develop back problems and arthritis-related conditions cannot continue to take care of their pets and are forced to give them up because they cannot feed them. The owner cannot bend to clean up the feeding area or simply bring the feeding dish to the animal's feeding level or retrieve it.

One pet feeder that is presently available, consists of a horizontal platter with a centrally located, rigidly attached vertical rod having a handle at the top. Two bowls rest on the platter with the rod between them so that all is reasonably in balance when the rod is lifted. This enables the operator with little bending, to put the bowls at floor level. As the advertisement correctly explains, this prevents falls from losing balance while putting food and water down.

One problem with this arrangement is that the weight of food and liquid in the two bowls should be about the same to prevent tilting of the platter when the assembly is lifted. Another problem is that the handle must be lifted over the operators head, or the apparatus must be lifted by the rod hand over hand in order to bring the bowls to a convenient level for servicing by an operator who is restricted to sitting or standing. Finally, although the bowl arrangement is well suited to feeding a cat, it is easily upset by a dog, as dogs are generally more active and excited during feeding. Furthermore, some tall animals, especially dogs, require a slightly raised feeding surface to minimize exaggerated lowering or raising of the head in order to access the food.

An animal feeding device is disclosed by F. B. Reichenbach in U.S. Pat. No. 2,661,800, patented Dec. 8, 1953. The device includes a platform for the animals, leading to individual feeding head stalls. A bar holds a series of cups, one below each animal's head for each stall. The bar is periodically lowered from feeding level to a reservoir for dipping of the cups and then brought back up to the animal.

An adjustable pet feeding stand is disclosed by Pauline E. Cooper in U.S. Pat. No. 3,651,787, patented Mar. 28, 1972. The stand includes a platform for bowls, vertical side walls having a total of four short legs, and four removable extension legs. Each extension leg has a longitudinal series of holes though which fastening may be made to one of the short leg, so that the platform can be assembled for different feeding heights according to the type and stage of growth of the animal.

Thomas R. Wix, in U.S. Pat. No. 4,205,629, patented June 3, 1980 discloses a frame with octagonal holes for receiving feeding bowls, mounted at one of a plurality of heights by a fastener through a selected hole of a longitudinal series of holes through a vertical stick. The stick may be mounted to the wall of a building or driven into the ground.

In U.S. Pat. No. 4,658,759, patented Apr. 21, 1987, Elizabeth A. Brown discloses an adjustable dog feeding food supporting platform having four extension legs that may be extended to any of a plurality of lengths. Each leg has a spring loaded pin which may extend through one of a longitudinal series of holes to lock the leg to a specific length. Each leg is also hinged for folding back against the food supporting platform for storage.

SUMMARY OF THE INVENTION

It is one object of the invention to provide an animal feeder with a food supporting platform that is adjustable to suit an animals best feeding height.

It is another object of the invention to provide an animal feeder with a food supporting platform that restricts spillage of food to the floor when the animal feeds.

Another object of the invention is to provide a height adjustable food supporting platform that can be lifted from the feeding level without need for stooping to grip the platform directly.

Another object is to provide an economical and simple animal feeder in which the food supporting platform can be lifted for cleaning and servicing, and placed at suitable level for feeding, by one who is too handicapped to perform those operations on presently available animal feeders.

Yet another object is to provide an animal feeder which is height adjustable by operator manipulation at a distance from the food supporting platform, and which does not require electrical power for adjusting the height.

The height adjustable feeding apparatus of the present invention includes a frame and a food supporting platform for animal food, with a vertical guide mounted on the frame for supporting the platform at a plurality of heights between the top and bottom portions of the frame.

The vertical guide includes means for moving the platform to various heights. Means for driving are attached to the means for moving.

The means for moving comprises threads on the vertical guide which, by their rotation, move the platform that is adapted for receiving the threads. The means for driving may be a hand crank or electric motor.

The food supporting platform includes a built-in feeding dish, or it may include an opening for sealingly receiving a feeding dish so that food displaced from the dish is restricted from exiting over the sides of the food supporting platform. Alternatively, the platform may receive food or a feeding dish on a flat upper surface.

The frame further includes a cabinet with openable top and front panels for access by operator and animal to the food supporting platform. A vertical wall of the cabinet is adapted for reducing lateral movement of the food supporting platform by, for example, close proximity to a side of the platform.

In another construction of the present invention, instead of threads, the vertical guide includes a vertical track. A track follower on the food supporting platform is adapted for riding the track so that the follower is restricted from lateral movement by the track and is free to move vertically along the track.

The track follower includes wheels for riding on the track for horizontal and lateral support for the food supporting platform.

The means for moving includes a first pulley mounted at the top portion of the frame, and a second pulley mounted at the bottom portion of the frame. A belt between the pulleys is attached by one part to the track follower. The belt is moved by a motor or hand crank attached to one of the pulleys.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Figure 1:
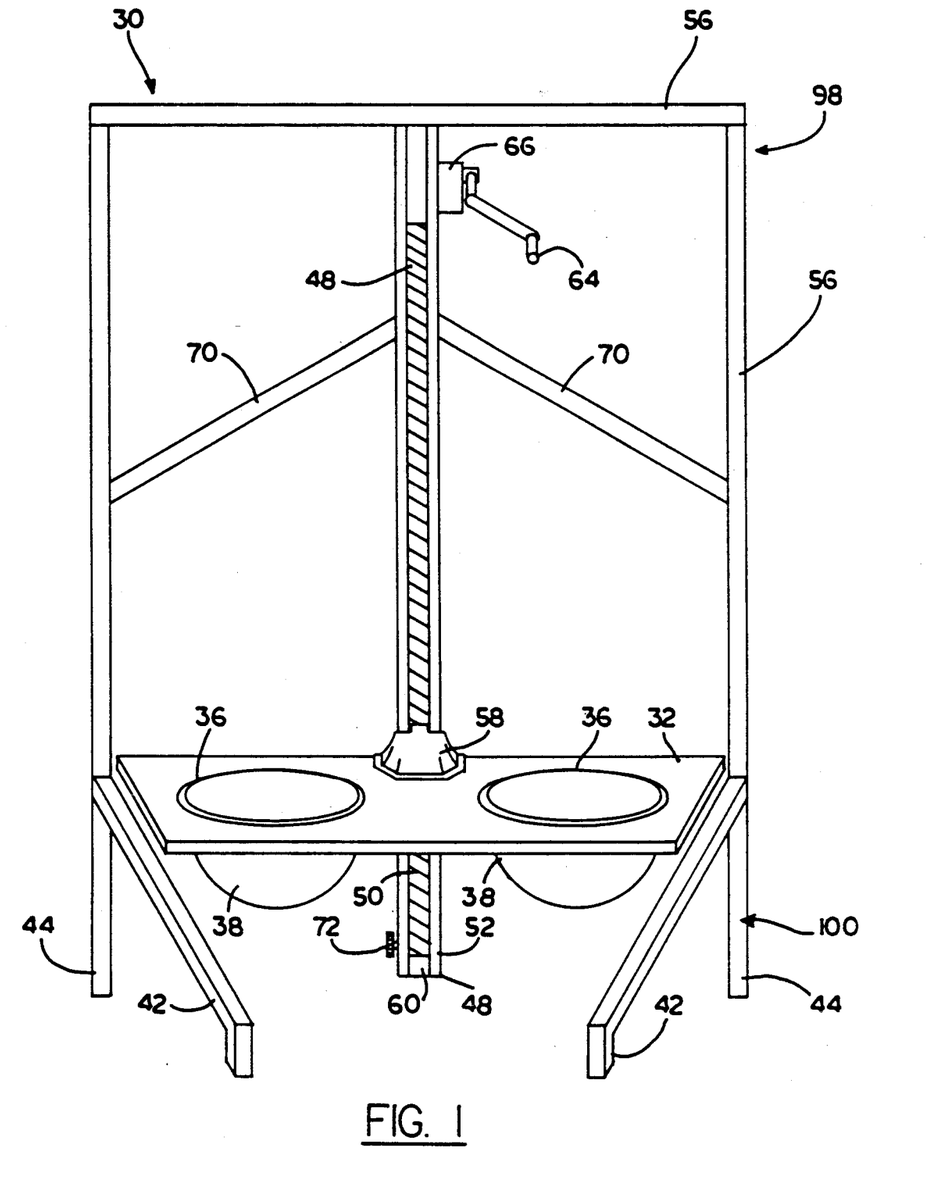
FIG. 1 is a front schematic view of the invention including a threaded driving assembly for vertical movement of the food supporting platform.

Referring to FIG. 1, height adjustable animal feeder 30 includes food supporting platform 32, having openings 36 for feeding dishes 38. A close tolerance is maintained between the openings and dishes to prevent leakage thorough the platform. Additional security against leakage through the platform is provided by tapered lips on the bowls and optional rubber seal rings (not shown).

Forward legs 42 preferably extend slightly forward of platform 32 to provide stability and support against the added weight of an animal which may put its paws on the platform. The size of the platform depends upon planned use. Typically it will be about twelve inches wide by twenty-four inches long. It should be made from an easy to clean, rust resistant material such as plastic or stainless steel.

Vertical guide 48 is preferably parallel to and shares the same plane with rear legs 44. Threads 50 of the vertical guide, protected by slotted collar 52, provide means for moving the platform vertically to any desired height between the top and bottom portions 98 and 100 of frame 56.

The platform is attached to the threaded vertical guide by threaded rider bracket 58 which extends through slot 60 and engages threads 50. When the threaded portion of guide 48 is driven by hand crank 64 through gearbox 66 to rotate counter-clockwise, platform 32 moves up the guide typically to a height of thirty to thirty-six inches for servicing of the feeding dishes by the operator. When the direction of hand crank 64 is reversed, the platform may be lowered to any animal feeding height desired including to the floor. Stop screw 72 prevents lowering the platform to the point where the bowls are forced back up through openings 36 by the floor upon which the apparatus rests.

Angled braces 70 add rigidity to the frame and vertical guide 48. Hand crank 64 is oriented toward the front of platform 32 and at the top portion of frame 56 so that it can be easily operated by a person who is standing or confined to a wheelchair or bed.

For added stability, the platform may be enlarged at the back end, with the vertical and parallel back legs passing through a portion of the platform so that they resist lateral movement of the platform (not shown).

Figure 2:
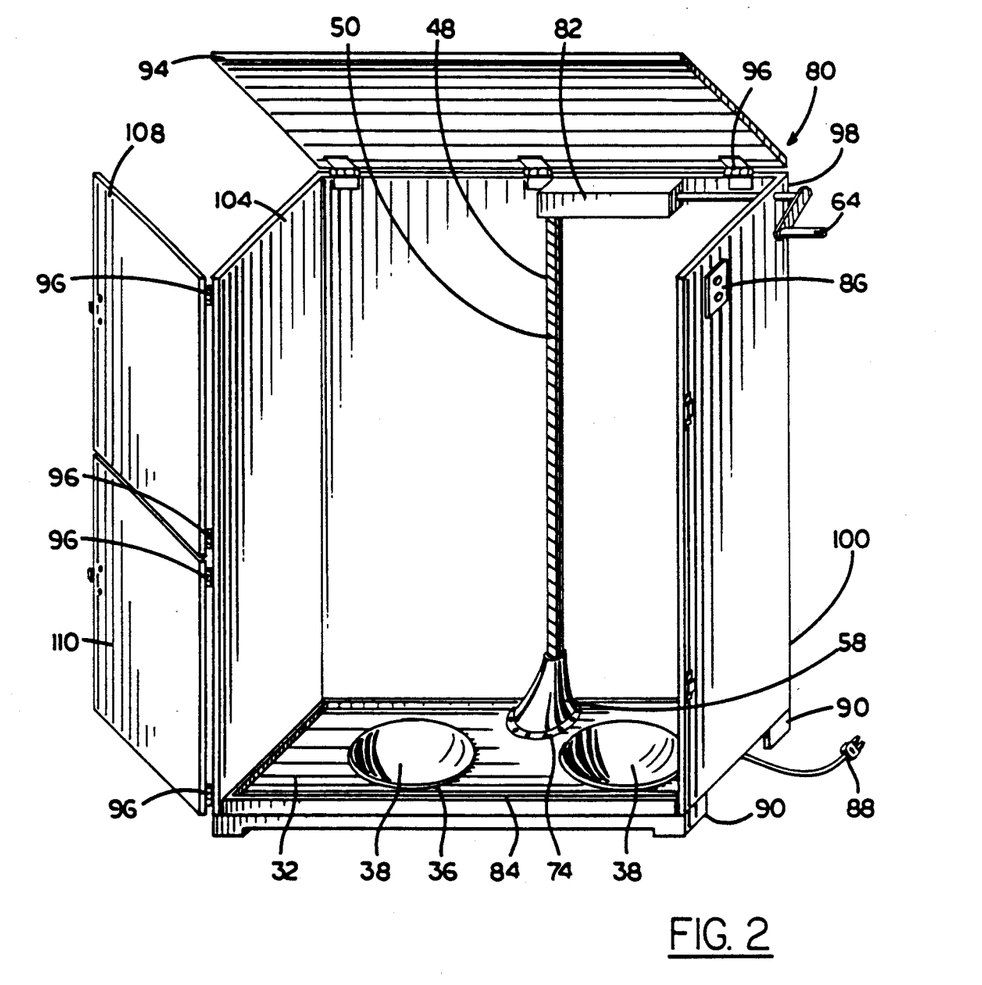
FIG. 2 is a front perspective view of the invention including a cabinet with access to the platform for feeding and servicing.

Height adjustable animal feeder 80, shown in FIG. 2, includes electric motor 82 which is preferably of the DC, electrically reversible type, although a mechanical reversing arrangement will serve the intended purpose. Motor 82 drives vertical guide 48 in either counter-clockwise or clockwise rotation, so that threads 50 will raise or lower respectively, food supporting platform 32. It is operated by momentary up and down pushbutton switch 86, and draws power through electric plug line 88. Alternatively, hand crank 64 may be used for driving. Front and back crosspiece base brackets 90 add rigidity to the cabinet. They also provide spacing between food supporting platform 32 and the floor on which the cabinet rests so that feeding dishes 38 are not forced back up through openings 36 when the platform is at the lowermost position.

Raised ridge 84 around feeding dishes 38 prevents spillage over platform 32 of food displaced from the dishes during feeding. Preferably, ridge 84 is ¼ to ½ inch high and includes an inward facing shallow angle for easy access by a cleaning rag or sponge.

Threaded rider bracket 58 is rigidly attached by bolts 74 to food supporting platform 32, with a bolting radius that is large enough to support the frame against tilting when it is in a raised position.

Top panel 94 is hinged 96 so that it may be lifted to service the platform when it is raised to the top portion 98 of frame 104 which comprises the cabinet shown.

Upper and lower left side panels 108 and 110 are hinged independently of one another, so that the lower one may be opened for access to the dishes by a feeding animal. The panels are removable by pulling hinge pins. For clarity of illustration, the right panels are not shown.

Figure 3:
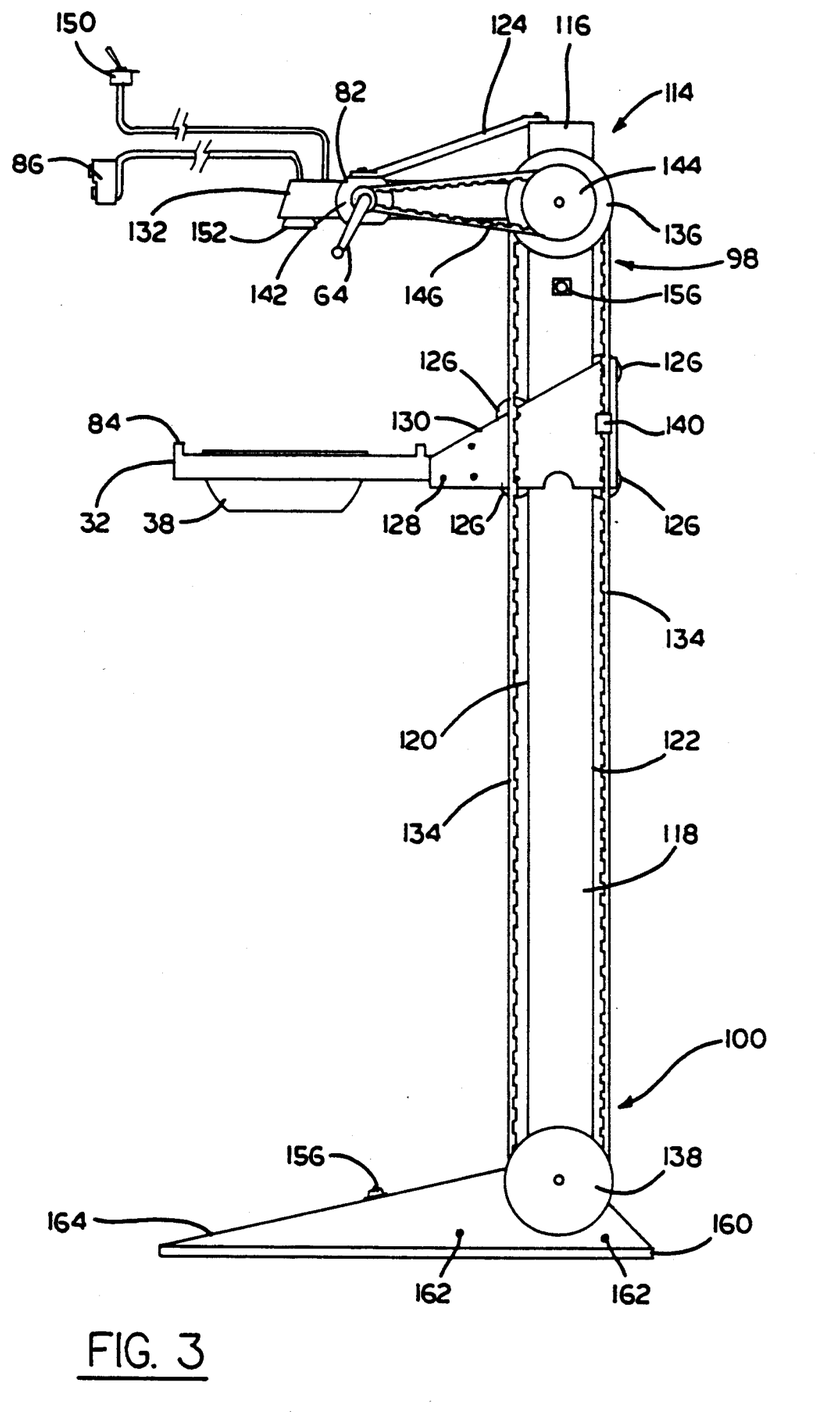
FIG. 3 is a right side schematic view of the invention including a belted driving assembly for vertical movement of the food supporting platform.

Referring to FIG. 3, frame 116 of height adjustable animal feeder 114 includes vertical guide 118 with front and back track 120 and 122 for receiving wheels 126 of track follower 130.

Food supporting platform 32, including molded-in feeding dish 38, and incorporating raised ridge 84 about the dish, is removably mounted by screws 128 to follower 130. Wheels 126, bearing on tracks 120 and 122 provide horizontal support for the follower and platform, and support against lateral movement of the follower.

Pushbutton switch 86 controlled electric motor 82, supported on frame 116 by brackets 124 and 132, drives a wheel and belt assembly for moving track follower and platform assembly up and down the vertical length of frame 116. This includes cogged belt 134 over upper pulley 136 and lower pulley 138, with the belt fastened at one point of its length to track follower 130 by screw clamp 140.

Motor 82 drives upper pulley 136 by way of speed reducing pulleys 142 and 144 and cog belt 146. Alternatively, hand crank 64 may be used for driving.

Although the belting is described as cog type, it is to be understood that other types may be used such as spring loaded V-belt or drive chain.

Switch 150 operates light 152 which illuminates the food supporting platform. Momentary switches 156 stop the motor when the track follower reaches the upper and lower limits of top portion 98 and bottom portion 100 of frame 116. The momentary switches may also be connected for automatic reversal of the motor when the upper and lower limits are reached.

Vertical guide 118 is attached to optional base 160 and base cover 164 by screws 162. Instead of being attached to the base, vertical guide 118 may be attached to a wall by brackets (not shown).

Figure 4:
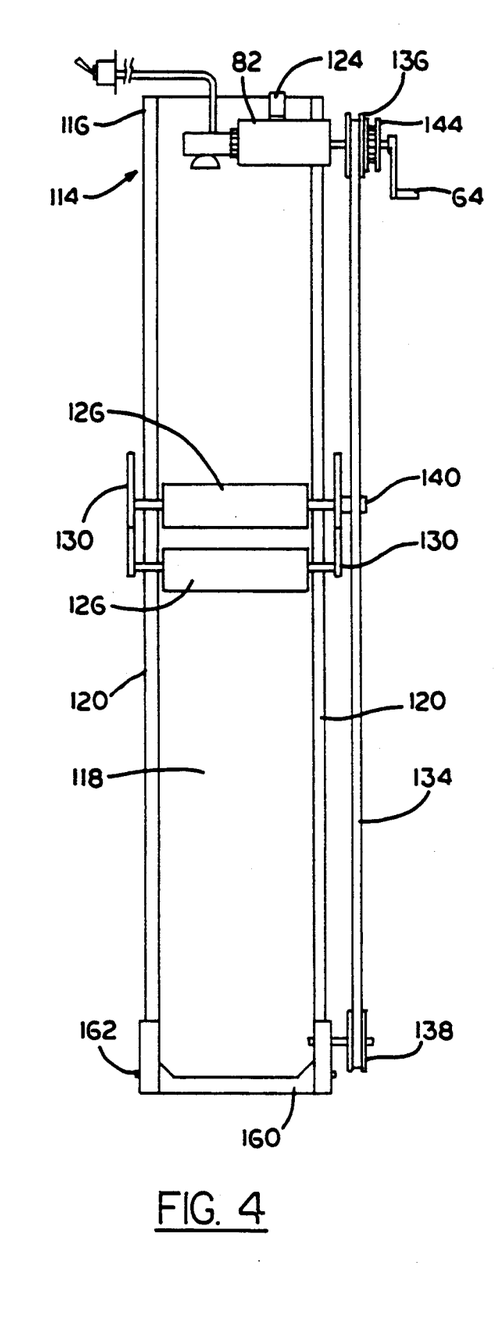
FIG. 4 is a front schematic view of the belted driving assembly with a wheeled track follower for restriction of lateral movement of the platform.

Referring to FIG. 4 and the front view of height adjustable animal feeder 114, less platform and base cover, wheels 126 locate between left and right front tracks 120. Although each wheel is shown as a roller of uniform dimension, it can take any shape which will assure horizontal and lateral support for track follower 130. For example each roller may have a center section of reduced diameter, or may be an assembly of two spaced wheels. For convenience of manufacture, the track can be made from a section of light weight I-beam material.

Figure 5:
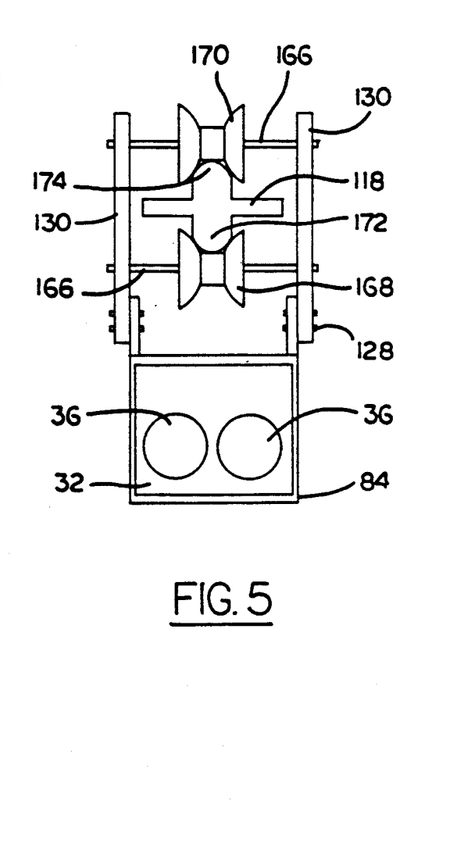
FIG. 5 is a top schematic view of another wheeled track follower according to the invention.

FIG. 5 shows another wheel configuration in top view. In this arrangement each V shaped front and back wheel 168 and 170 on a shaft 166 provides horizontal support and lateral support as they run vertically on front and back central tracks 172 and 174 of vertical guide 118 which includes lateral ribs for added rigidity. For good horizontal support against the weight of food supporting platform 32 transmitted back through track follower 130, two front wheels or two back wheels, one above the other, are provided (not shown).

Figure 6:
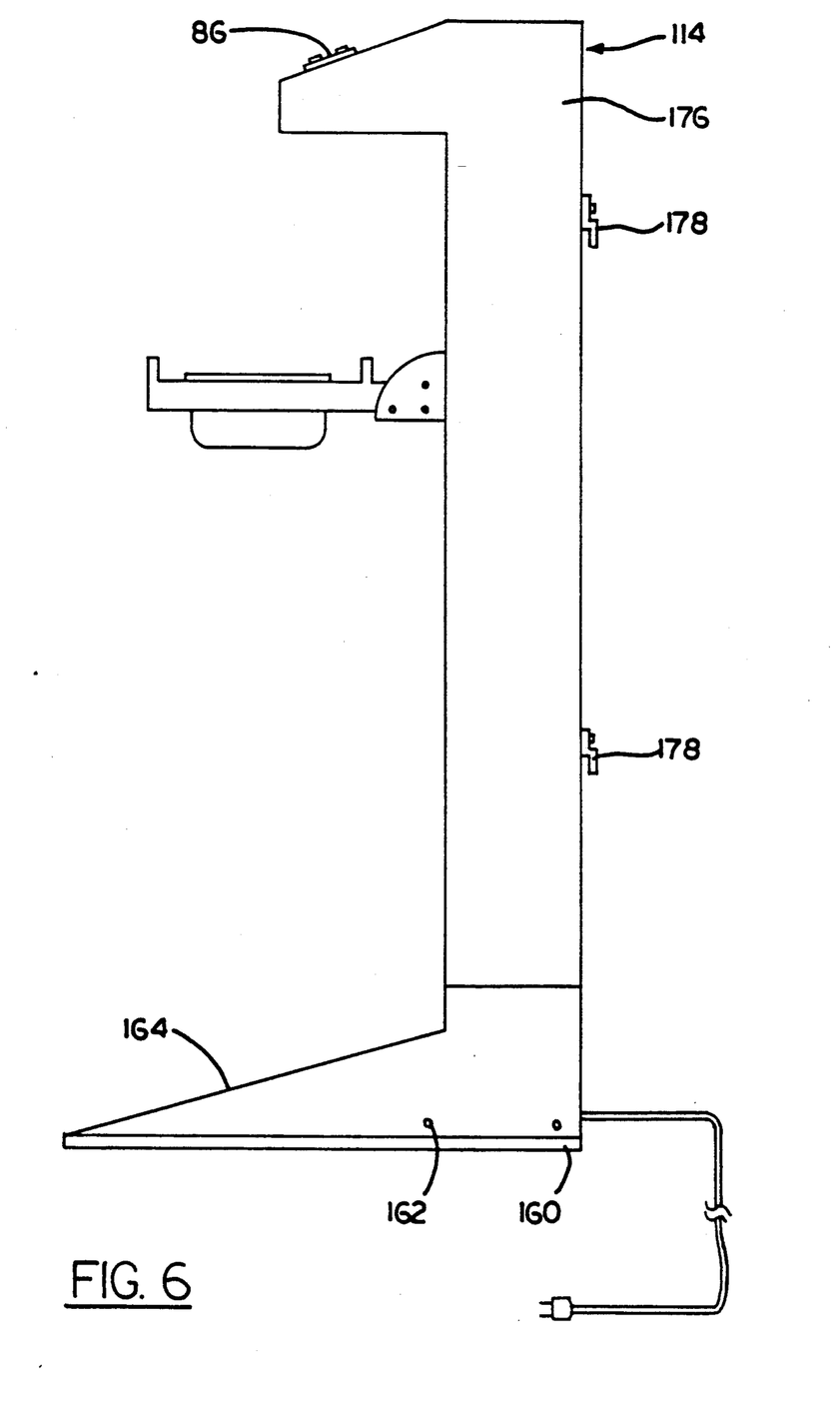
FIG. 6 is a right side schematic view of the invention.

In FIG. 6, housing 176 of height adjustable animal feeder 114 includes mounted switch 86, located at the front of the housing for easy access by an operator who is standing or confined to a wheelchair. An alternate or a second, remote switch such as a foot operated one may be provided for convenience of the operator.

The feeder may be placed directly on a floor, supported by optional base 160, or mounted on a wall by brackets 178.

By the above description explanation, it is seen that there is provided a height adjustable animal feeder conveniently usable by a handicapped operator.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. A height adjustable animal feeding apparatus for an operator with limited mobility, said apparatus comprising:

a frame having a top and a bottom portion,
a food supporting platform for receiving animal food,
vertical guide means mounted on said frame for supporting said food supporting platform at any height between the top and bottom portions of said frame,
said vertical guide means comprising means for continuously moving said food supporting platform to said any height,
means for driving, attached to said means for moving for operating said means for moving, and
means for operating said means for driving, connected to said means for driving in such a manner that said means for operating is accessible to an operator who cannot handle said food supporting platform at said lowest height.

2. The height adjustable animal feeding apparatus described in claim 1, further comprising:

said means for moving comprising threads on said vertical guide means,
said food supporting platform being adapted for receiving said threads for moving said food supporting platform to said any height by rotation of said threads.

3. The height adjustable animal feeding apparatus described in claim 2, further comprising:

said means for driving comprising hand crank means, and said means for operating comprising a handle being above the lowest height to which the tray is movable so that said crank is accessible to an operator who cannot handle the food supporting platform at said lowest height.

4. The height adjustable animal feeding apparatus described in claim 3, further comprising:

said hand crank means being oriented toward the front of said food supporting platform and located at the top portion of said frame so that said crank can be operated by a handicapped person who cannot reach the food supporting platform when it said platform is located at the bottom portion of said frame.

5. The height adjustable animal feeding apparatus described in claim 4, further comprising:

said food supporting platform including means for receiving a feeding dish, and
a raised ridge on said food supporting platform, spaced from the feeding dish so that food displaced from said dish on to said platform is restricted from exiting over the sides of the food supporting platform.

6. The height adjustable animal feeding apparatus described in claim 4, further comprising:

said frame further comprising cabinet means for enclosing said food supporting platform and said vertical guide means,
a top panel movably mounted on said cabinet for access by an operator to said food supporting platform when the food supporting platform is near the top portion of said frame, and
a front panel comprising an upper section and a lower section which is independently movable with respect to the upper section, said lower section being movably mounted on said cabinet for access to the food supporting platform by a feeding animal when the food supporting platform is near the bottom portion of said frame,
said platform being adjustable upward to a level at which the platform is behind the upper section of the front panel.

7. The height adjustable animal feeding apparatus described in claim 2, further comprising:

said means for driving being reversible in direction of rotation, and comprising an electric motor, switch means, connected to said means for driving for reversing the direction of rotation, said food supporting platform including means for receiving a feeding dish.

8. The height adjustable animal feeding apparatus described in claim 7, further comprising:

said frame further comprising cabinet means for enclosing said food supporting platform and said vertical guide means, a top panel movably mounted on said cabinet for access by an operator to said food supporting platform when the food supporting platform is near the top portion of said frame, and a front panel comprising an upper section and a lower section which is independently movable with respect to the upper section, said lower section being movably mounted on said cabinet for access to the food supporting platform by a feeding animal when the food supporting platform is near the bottom portion of said frame, said platform being adjustable upward to a level at which the platform is behind the upper section of the front panel.

9. The height adjustable animal feeding apparatus described in claim 1, further comprising:

said vertical guide means comprising a vertical track, track follower means on said food supporting platform, adapted for riding said track so that said track follower means is restricted from lateral movement by said track, and free to move vertically along said track, said track follower means being attached to said means for moving.

10. The height adjustable animal feeding apparatus described in claim 9, further comprising:

said means for driving comprising hand crank means located at the top portion of said frame so that said crank can be operated by a handicapped person who cannot reach the food supporting platform when said platform is located at the bottom portion of said frame.

11. The height adjustable animal feeding apparatus described in claim 9, further comprising:

said track follower means comprising a wheel adapted for riding on said track for said restriction of lateral movement.

12. The height adjustable animal feeding apparatus described in claim 9, further comprising:

said track having a front and a back, said track follower means comprising a first wheel adapted for riding on the front of said track and a second wheel adapted for riding on the back of said track, for horizontal support of said food supporting platform.

13. The height adjustable animal feeding apparatus described in claim 9, further comprising:

said means for moving comprising a first pulley mounted at the top portion of said frame, a second pulley mounted at the bottom portion of said frame, belt means between said pulleys, said belt being attached to said track follower means;

said means for driving being attached to one of said pulleys.

14. The height adjustable animal feeding apparatus described in claim 13, further comprising:

said track follower means comprising a wheel adapted for riding on said track for said restriction of lateral movement.

15. The height adjustable animal feeding apparatus described in claim 14, further comprising:

said means for driving comprising hand crank means located at the top portion of said frame so that said crank can be operated by a handicapped person who cannot reach the food supporting platform when said platform is located at the bottom portion of said frame.

16. The height adjustable animal feeding apparatus described in claim 1, further comprising:

said means for moving comprising threads on said vertical guide means, said food supporting platform being adapted for receiving said threads for moving said food supporting platform along said threads to said any height by rotation of said threads.

17. A height adjustable animal feeding apparatus for an operator with limited mobility, said apparatus comprising:

a frame having a top and a bottom portion, a food supporting platform for receiving animal food, vertical guide means mounted on said frame for supporting said food supporting platform at any height between the top and bottom portions of said frame, said vertical guide means comprising means for continuously moving said food supporting platform to said any height, means for driving, attached to said means for moving for operating said means for moving, means for operating said means for driving, connected to said means for driving in such a manner that said means for operating is accessible to an operator who cannot handle said food supporting platform at said lowest height, said food supporting platform including means for receiving a feeding dish, and a raised ridge on said food supporting platform around the feeding dish so that food displaced from said dish is restricted from exiting over the sides of the food supporting platform, said means for driving comprising an electric motor, switch means connected to said motor for operating said means for driving, said vertical guide means comprising a vertical track, track follower means on said food supporting platform, adapted for riding said track so that said track follower means is restricted from lateral movement by said track, and free to move vertically along said track, said track follower means being attached to said means for moving and comprising a wheel adapted for riding on said track for said restriction of lateral movement, said means for moving comprising; a first pulley mounted at the top portion of said frame, a second pulley mounted at the bottom portion of said frame, and belt means between said pulleys, said belt being attached to said track follower means;

said means for driving being attached to one of said pulleys.

18. The height adjustable animal feeding apparatus described in claim 17, further comprising:

a switch, located on said frame for actuation by a moving element of said apparatus for preventing excessive vertical travel of the food supporting platform.

19. The height adjustable animal feeding apparatus described in claim 17, further comprising:
said vertical guide means having a front and a back,
said vertical track comprising a forward projecting vertical rib on the front of said vertical guide means, and a rearward projecting vertical rib on the back of said vertical guide means, and
said wheel adapted for riding on said track comprising two V shaped wheels, one V shaped wheel riding said forward projecting rib, and one V shaped wheel riding said rearward projecting rib.

20. The height adjustable animal feeding apparatus described in claim 17, further comprising:
said vertical guide means having a front and a back,
said vertical track comprising a pair of forward projecting vertical ribs on the front of said vertical guide means, and
said wheel adapted for riding on said track being located between said pair of forward projecting vertical ribs.

* * * * *

UNITED STATES PATENT AND TRADEMARK OFFICE
CERTIFICATE OF CORRECTION

PATENT NO. : 5,054,431
DATED : Oct. 8, 1991
INVENTOR(S) : Andrew G. Coviello

It is certified that error appears in the above-identified patent and that said Letters Patent is hereby corrected as shown below:

In the Abstract, line 5, change "stopping" to "stooping", and on line 6, change "electirc" to "electric".

Signed and Sealed this

Ninth Day of February, 1993

Attest:

STEPHEN G. KUNIN

Attesting Officer

Acting Commissioner of Patents and Trademarks